(No Model.) 10 Sheets—Sheet 1.

H. DESRUMAUX.
APPARATUS FOR PURIFYING WATER.

No. 522,729. Patented July 10, 1894.

(No Model.) 10 Sheets—Sheet 3.

H. DESRUMAUX.
APPARATUS FOR PURIFYING WATER.

No. 522,729. Patented July 10, 1894.

Witnesses:
L. M. Wachschlager
Henry E. Cording

Inventor
Henri Desrumaux,
by Briesen & Knauth
his Attorneys.

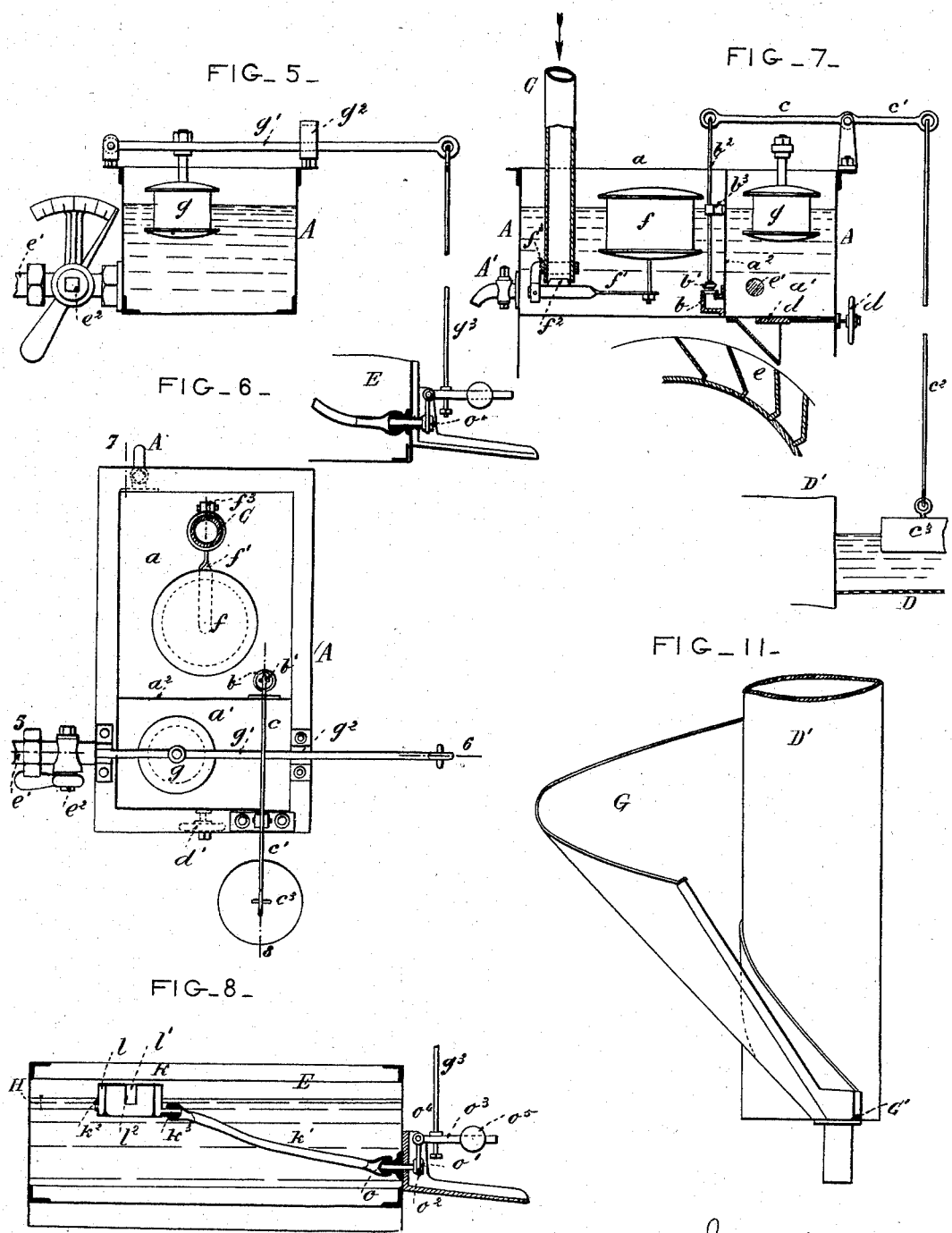

(No Model.) 10 Sheets—Sheet 5.

H. DESRUMAUX.
APPARATUS FOR PURIFYING WATER.

No. 522,729. Patented July 10, 1894.

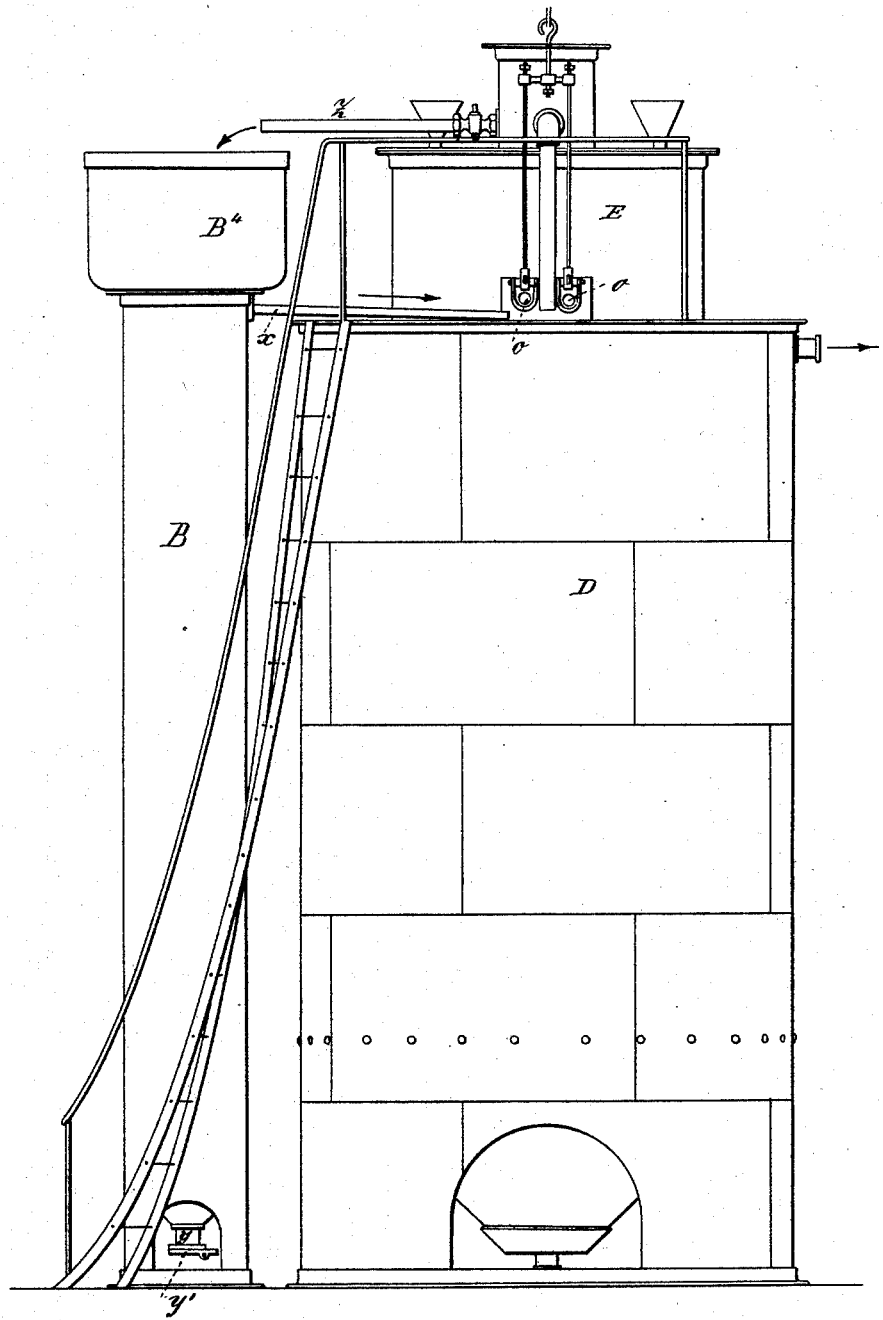

(No Model.) 10 Sheets—Sheet 7.
H. DESRUMAUX.
APPARATUS FOR PURIFYING WATER.
No. 522,729. Patented July 10, 1894.
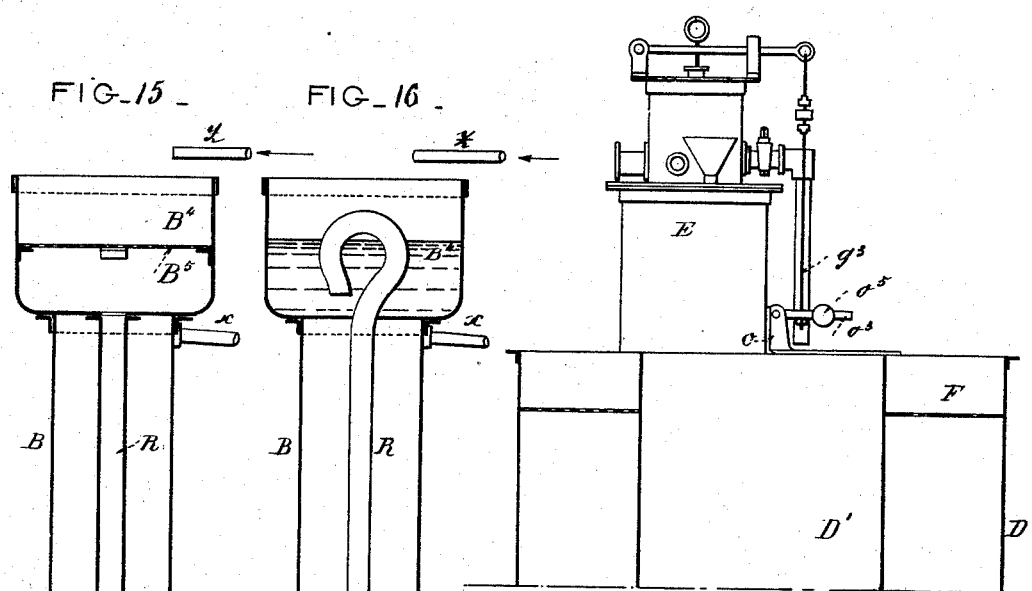
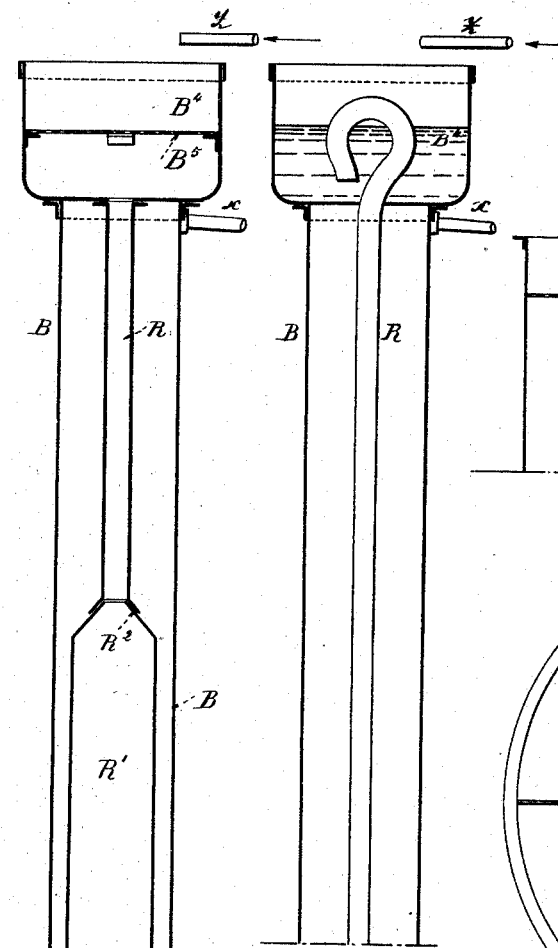
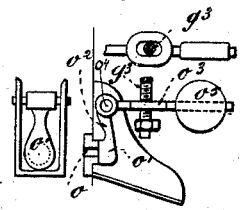
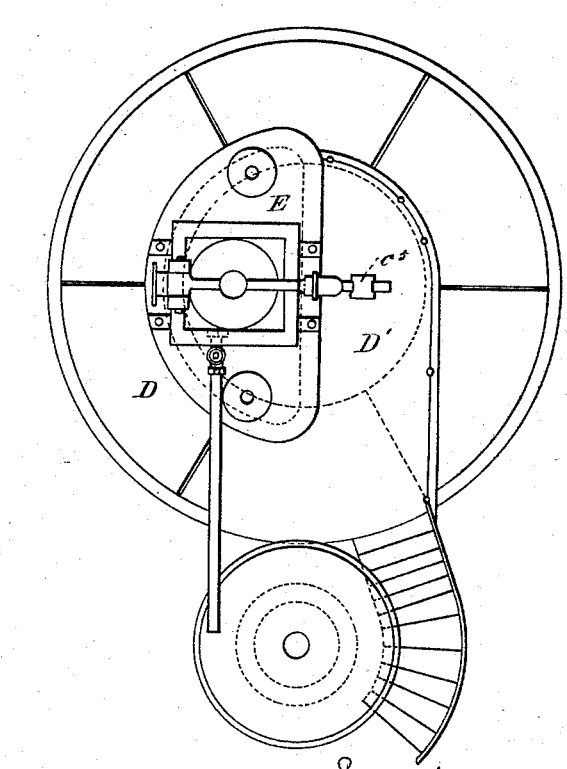

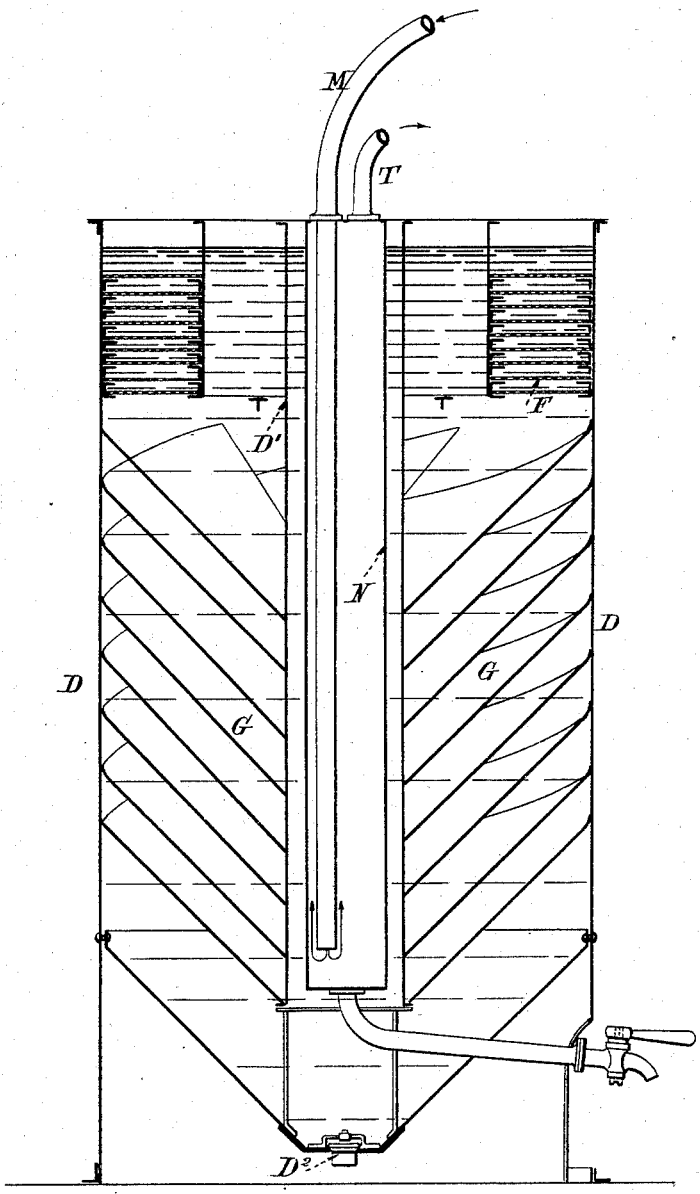

(No Model.)  10 Sheets—Sheet 9.

H. DESRUMAUX.
APPARATUS FOR PURIFYING WATER.

No. 522,729. Patented July 10, 1894.

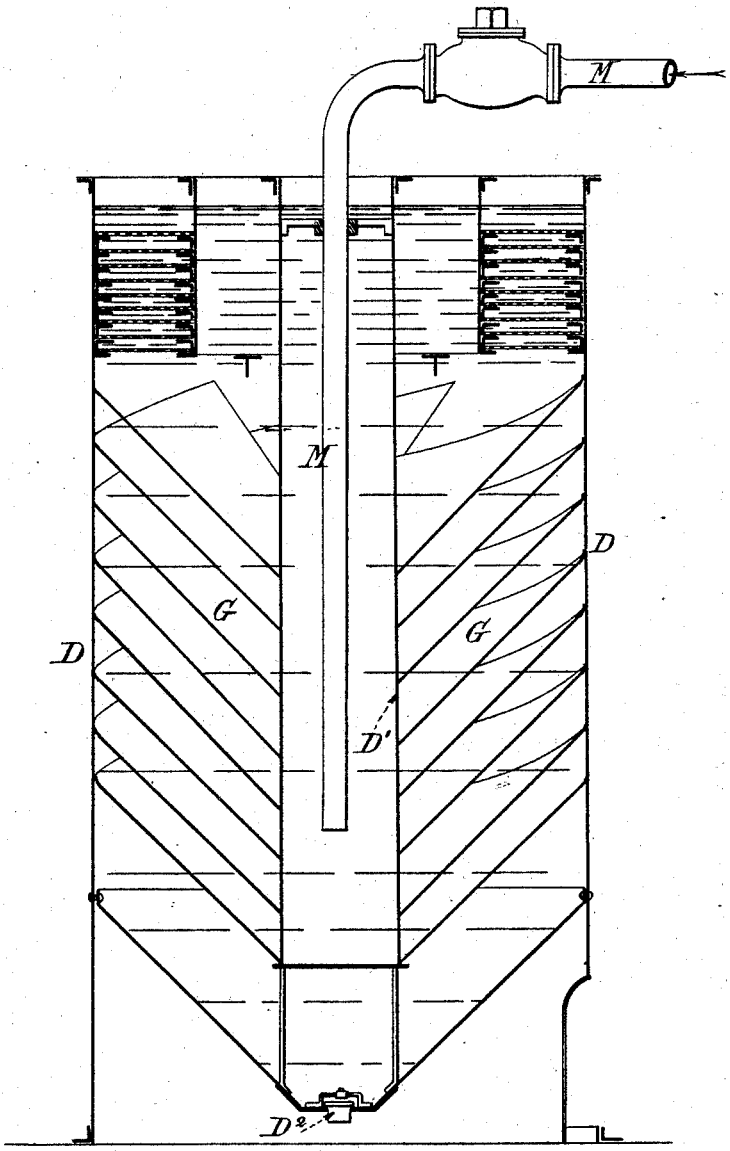

UNITED STATES PATENT OFFICE.

HENRI DESRUMAUX, OF LILLE, FRANCE.

APPARATUS FOR PURIFYING WATER.

SPECIFICATION forming part of Letters Patent No. 522,729, dated July 10, 1894.

Application filed February 19, 1892. Serial No. 422,154. (No model.) Patented in France July 16, 1888, No. 191,692; in Belgium July 24, 1888, No. 82,669; in Austria-Hungary March 20, 1889, No. 46,508 and No. 6,215; in England April 26, 1889, No. 7,006; in Germany April 28, 1889, Nos. 57,082 and 57,717; in Switzerland June 3, 1889, No. 990; in Italy June 30, 1889, No. 25,346/176, and in Spain July 4, 1889, No. 9,564.

*To all whom it may concern:*

Be it known that I, HENRI DESRUMAUX, engineer, of Lille, in the Republic of France, have invented a new Purifying and Decanting Apparatus, (for which I have obtained Letters Patent of France for fifteen years, No. 191,692, dated July 16, 1888; of Great Britain, No. 7,006, dated April 26, 1889; of Switzerland, No. 990, dated June 3, 1889; of Austria-Hungary, No. 46,508 and No. 6,215, dated March 20, 1889; of Italy, No. 25,346/176, dated June 30, 1889; of Belgium, No. 82,669, dated July 24, 1888; of Spain, No. 9,564, dated July 4, 1889, and of Germany, Nos. 57,082 and 57,717, dated April 28, 1889;) and I do hereby declare that the following is a full and exact description thereof, reference being made to the accompanying drawings.

My invention relates to apparatus for purifying and decanting liquids containing solid particles in suspension either naturally or in the form of precipitates resulting from some chemical reaction, and said invention consists in the details and arrangement and combination of parts hereinafter described and claimed.

In order that my invention may be fully understood both as a whole and as to its component parts, I will describe it in detail in referring to the accompanying drawings, in which—

Figure 1 is an elevation taken at the side on which is the purifying and saturating device. Fig. 2 is a vertical section on the line 1—2 of Fig. 3; Fig. 3 a plan view corresponding to Fig. 2; Fig. 4 a horizontal section on the line 3—4 of the saturator, Figs. 2; Figs. 5, 6 and 7 are detail views of the distributing vessel; Fig. 5 being a vertical section on the line 5—6 of Fig. 6; Fig. 6 a plan, and Fig. 7 a vertical section on the line 7—8 of said Fig. 6. Fig. 8 represents a transverse central sectional view of the reagent distributer. Fig. 9 is a like view of a modification of the same. Fig. 10 is a top view of this modification. Fig. 11 is a detail view of a continued screw with terminal wall. Figs. 12, 13 and 14 are an elevation, a part vertical section, and a plan of a modified purifying apparatus. Figs. 15 and 16 are vertical sectional detail views of the saturator; and Fig. 17 shows a connection of the float of the distributing vessel with the discharge valve of the regulator. Figs. 18, 19 and 29 are vertical sectional views of different modifications of the steam injectors.

This apparatus has been specially designed for purifying the waters used for manufacturing purposes, but in its principles and in its component parts it is suitable for purifying the waters used for domestic purposes.

The apparatus is shown as a whole in Figs. 1, 2 and 3, and comprises four chief parts, to-wit: first, the distributing vessel A, to which leads the main supply pipe C (Figs. 1, 6 and 7) of the water to be purified; second, the preparator-saturator of reagent B; third, the decanter D; and fourth, the reagent distributer E. These different parts may be grouped in the manner shown in the drawings or according to any other disposition, on the sole condition that the flow and mixture of water and reagents shall take place and the water be finally discharged in a purified condition, as explained hereinafter.

What I have termed the distributing vessel A is divided by a partition $a^2$, into two compartments $a$ $a'$, (Figs. 6 and 7) which communicate with each other by means of a small tube $b$ applied to the partition $a^2$ and projecting into compartment $a$. Compartment $a$ is the receiver of the water to be operated upon and which is supplied by the main supply pipe C; (Figs. 1, 6 and 7) a float $f$ regulates the level of the water in this compartment, in acting through an oscillating lever $f'$, to which it is connected on the plug $f^2$, which presents itself at the water port of the supply pipe C, and which is mounted on the said lever $f'$. This lever $f'$ is pivoted to the foot of a brace $f^3$ fixed on the pipe C. The second compartment $a'$, which is the distributer, properly so called, receives the water from the small tube $b$, which forms at its opening a valve-seat which is adapted to be closed by the valve $b'$ fixed at the end of a vertical rod $b^2$ sliding in a guide $b^3$ riveted to the partition $a^2$. The rod $b^2$ is jointed to the end of a lever $c$ $c'$, of which the arm $c'$ is itself jointed to a long rod $c^2$, to which is suspended a float $c^3$. This float floats on the water of the decanting apparatus D, above the filter, with which this apparatus is provided. It will now be understood that if the level of the water in the decanter falls, the float $c^3$ acts on the lever $c\ c'$ and opens either partially or wholly the water port $b$, in the distributer $a'$. At the bottom of the compartment $a'$ is disposed the valve $d$, the position of which can be regulated by moving the hand-wheel $d'$ which distributes the water on the water-wheel $e$ and operates the preparing and saturating device B. The float $g$ is placed in the distributer $a'$, and, by means of a lever $g'$, guide $g^2$ and rod $g^3$, acts on the valve $o'$ of the reagent distributing vessel E so that the distribution of the reagents depends on this float $g$ which opens or closes the valve $o'$, as determined by the level of the water on which it floats. The float $g$ of the distributer $a'$ has for its object to allow or interrupt the distribution of other reagents than lime water, as will be hereinafter described.

A' (Figs. 6 and 7) is a let-off cock for the water in the first compartment $a$.

The cylinder B of the mixing device is (Fig. 2) open at the top, and at the bottom is of the form of a truncated cone B' provided with a port adapted to be closed by a valve $B^2$, which places itself between the opening in the said bottom and a vertical tube $B^3$, through which the mixing device empties itself, and which also serves as a support therefor. Above the valve $B^2$ appears the support $h'$ of a socket, in which rests the end of a vertical hollow shaft $h$ which is journaled at the top to a yoke $h^2$ bolted to the edge of the cylinder B. At its extreme upper end the hollow shaft $h$ receives the basin $h^3$ into which falls the water fed from the distributing vessel A, by the pipe $e'$, and the flow of which is regulated by the cock $e^2$. This water is conducted by the shaft $h$ to the bottom of the preparator where it runs through suitable perforations $i^3$ in the said shaft. Above the small yoke $h^2$ the shaft $h$ is provided with a miter gear $h^4$ moved by a pinion of the same form $e^3$, which is mounted on an extension of the shaft of the water-wheel $e$. On its lower part the shaft $h$ has the arms $h^5\ h^5$ which move between fixed arms $h^6$ bolted to the inner walls of the preparator.

The shaft $h$ turns concentrically to a tube $i$ of much greater diameter which incloses it and which is held at the top on a cross-piece $i'$, fixed to the crown of the cylinder B and at the bottom by means of radial plates $i^2$ fixedly mounted in the said cylinder B. In the upper zone or this cylinder I have reserved the chamber $j$ intended for the preparation of the lime water. The lime is placed in this space $j$ outside the concentric partition $j^x$ pierced by holes, so that when the water of the saturator rises into the chamber $j$ lime water is formed and flows through an opening in the wide tube $i$ which is controlled by a valve $j'$ worked by the help of a hand-wheel $j^2$, pinion $j^3$, and a rack rod $j^4$ which forms an integral part of the valve. This making of the lime water, which is automatic so to say, is most important, for fresh lime water may thus be made, without any work of hand, and as often as may be required.

The decanter D, which I show as being placed beneath the distributing vessel A and the operating water-wheel $e$, is in the form of a large cylindrical receptacle having a truncated cone bottom, and in the center of which is another concentric cylinder D' hollow and opening at the lower end at some distance above the truncated cone bottom. The inclosed cylinder D' is supported by suitable brackets, as shown at $z'$ and constitutes the cylinder of reaction where the chemical reactions take place, and at the top of which is received the water to be purified and also the reagents. In the space between the outer casing and the cylinder D' are fixed the conic plates G arranged in the form of a helix around the cylinder D' and partly shut in at their lower ends by the vertical partitions G'. At the top the said plates end at the filter F which is preferably formed of thin plates placed one above the other and having a great number of perforations. The cylinder D' rests on the truncated cone bottom of the casing; a valve $D^2$ worked by the lever $D^3$ allows the apparatus to be emptied. The cylinder D' ends at the bottom in suitable peripherical openings (not shown) through which the water runs off. The end partition at the base of each of the screw plates G serves to hold the deposits of solid particles or precipitates of the water which run down the screw plates. The said deposits are carried by small collecting sewers (not shown) to a suitable dirt reservoir.

Filters generally used are formed of a mass of porous material, such as Bahama sponges, fibrous shavings, charcoal, &c. The filter thus composed gets dirty all the sooner that its constitution is more perfect, and it is difficult and generally impossible to clean it thoroughly. Therefore, the filtering material has to be frequently replaced and that cannot be done without stopping the working of the apparatus and that loses both time and money. To prevent these difficulties and other ones arising from the nature even of the filtering material, I preferably make my filter F of plates or partitions having perforations and arranged so that the waters to be filtered have to pass through the perforations of the first plate, then those of the second one, and so on to the last plate or partition, beyond which the water, perfectly filtered, can be used for the industrial purposes for which it is intended. By this use of plates or partitions with perforations I dispense with the use of filtering material and overcome to a great extent the stoppage and obstruction in the filter, and I have, moreover, the advantage of being able to quickly wash and clean the filter.

Figs. 2, 8, 9 and 10 show the arrangements of distributer for reagents, which I preferably adopt. The reagent distributer consists mainly of a receptacle E containing the reagent, a float therein through which the liquid passes by a suitable pipe connection to the outlet orifice, so that this liquid comes to the outlet orifice constantly and without any change, whatever the level in the reservoir may be, it being understood that the said level with respect to the opening in the float is always absolutely the same. In Fig. 8 it will be seen that the liquid contained in the reservoir E sustains the float $k$, which is connected with the discharge $o$, by means of a flexible tube $k'$. The float $k$ is perforated at several points $k^2$, which perforations serve as an access for the reagent. As it is easy to determine the sections of the perforations $k^2$ and of the orifice $o$ so that the liquid may not enter in too large quantities into the float, it will be understood that the said entry will be made under a constant pressure, and one which is proportional to the height of water H measured from the axis of the hole $k^2$ to the level of the liquid in the reservoir E, which proportional height of water is absolutely invariable, for the weight of the float remains always the same. The constant supply of the reagents by this means can only be obtained by the orifice $o$ always remaining open; but it cannot be allowed to remain always open for the operation of the general apparatus may be delayed or stopped, and I therefore provide means for either a proportionate or total closing of the discharge $o$. It is for this reason that in the second compartment $a'$ of the distributing vessel A I have adopted a float $g$ which acts through the rod $g^3$ on the valve $o'$ of the said orifice; when the level in $a'$ falls the float $g$ causes the discharge $o$ to be wholly or partially closed.

To make the float $k$ in the vessel E as efficacious as possible I may give it the form of a cylinder (Fig. 8) provided with an annular reservoir $l$, in which is the inlet $k^2$, and which is provided with the fitting $k^3$, to which is connected the flexible tube $k'$. The top of the cylinder is covered except at the center where there is a perforation $l'$ provided with a tube $l^2$ of a determined length. This length is indeed such, that in case the annular reservoir $l$ were to be partially and purposely filled, air will be confined under the bell by the sealing of the tube $l^2$ due to the immersion of the float (immersion produced by the arrival of too great a quantity of liquid in $l$), and the sinking of the float will be prevented and a downward limit assigned to it beyond which it cannot go.

By reason of the corrosive nature of the reagents to be distributed, the float $k$ will preferably be made of gutta-percha, but without excluding the use of any other suitable substance.

In order to prevent the float $k$ from vaccillating and from losing its proper position from any cause whatever I may provide this float with a ball $q$ (Fig. 9) which will secure perfect stability. This ball is suspended at the end of a rod $q'$ screwed into the ball, and being at the top integral with a ring $q^2$. Two cross-pieces $q^3$ or perforated washers form an outlet for the issue of air.

The valve $o'$ of the discharge $o$ is connected to one arm $o^2$ of a bell-crank lever pivoted at a fixed point $o^4$. The other arm $o^3$ is provided with a weight $o^5$ which is moved as desired for regulating the co-relation of the float $g$, in the compartment $a'$, of the vessel A, with the valve $o'$.

Fig. 17 is a detail view of the construction of the plug $o'$ and of the connection of the bell-crank lever $o^2$ $o^3$ with the rod $g^3$ of the float $g$.

Figs. 12, 13 and 14 show the whole of a modified form of purifying apparatus.

Figs. 15 and 16 are sectional detail views of the preparator-saturator.

Figure 1:
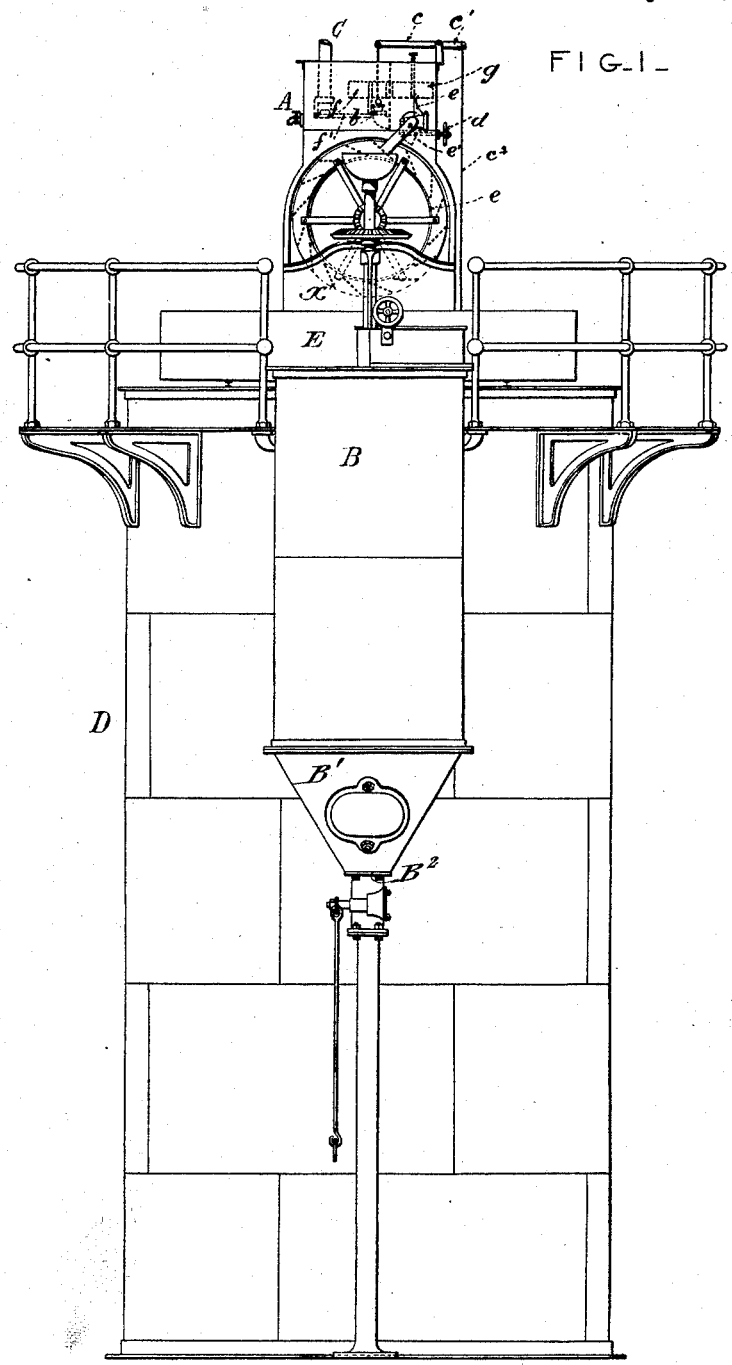
Figure 2:
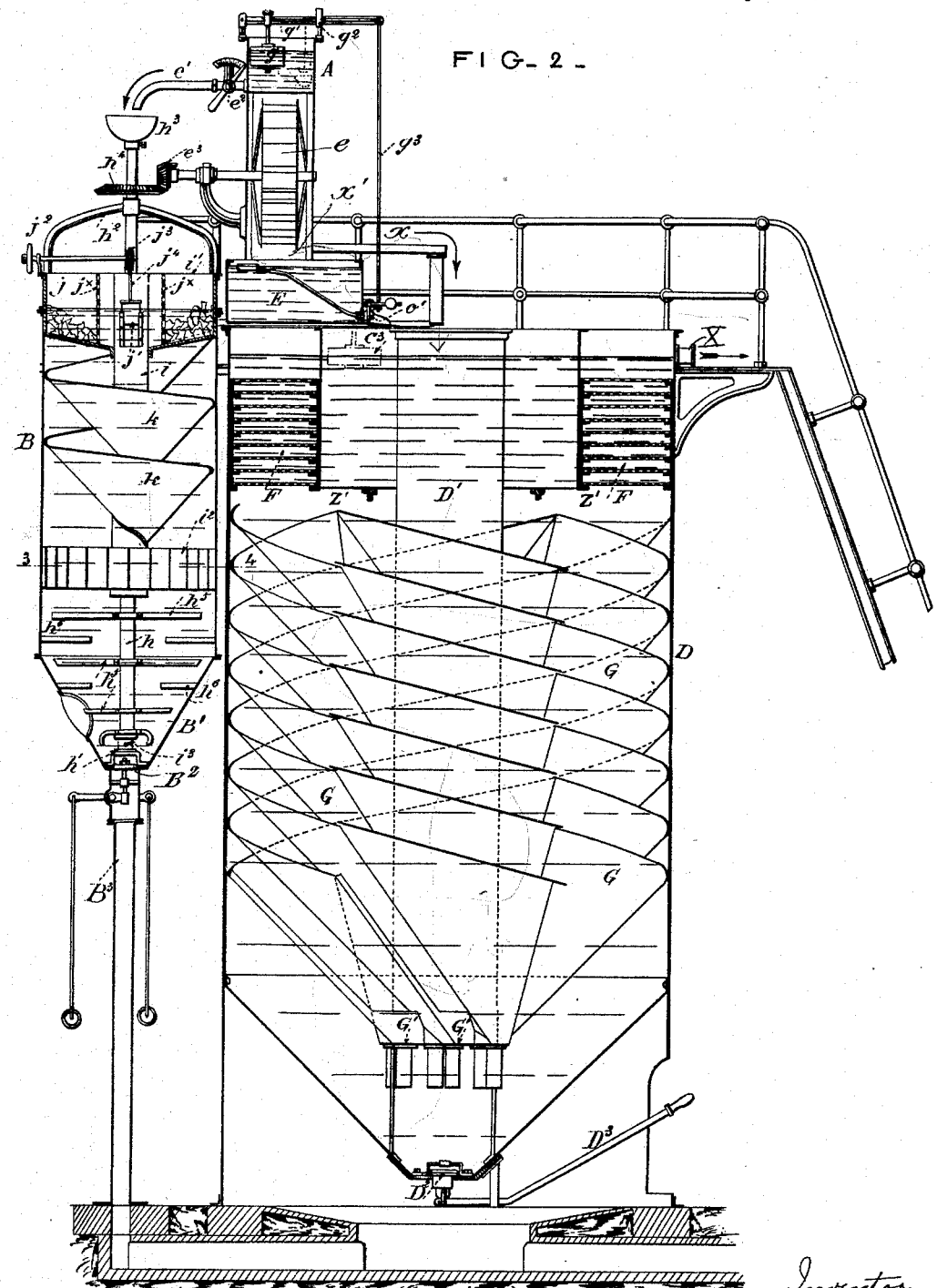
Figure 3:
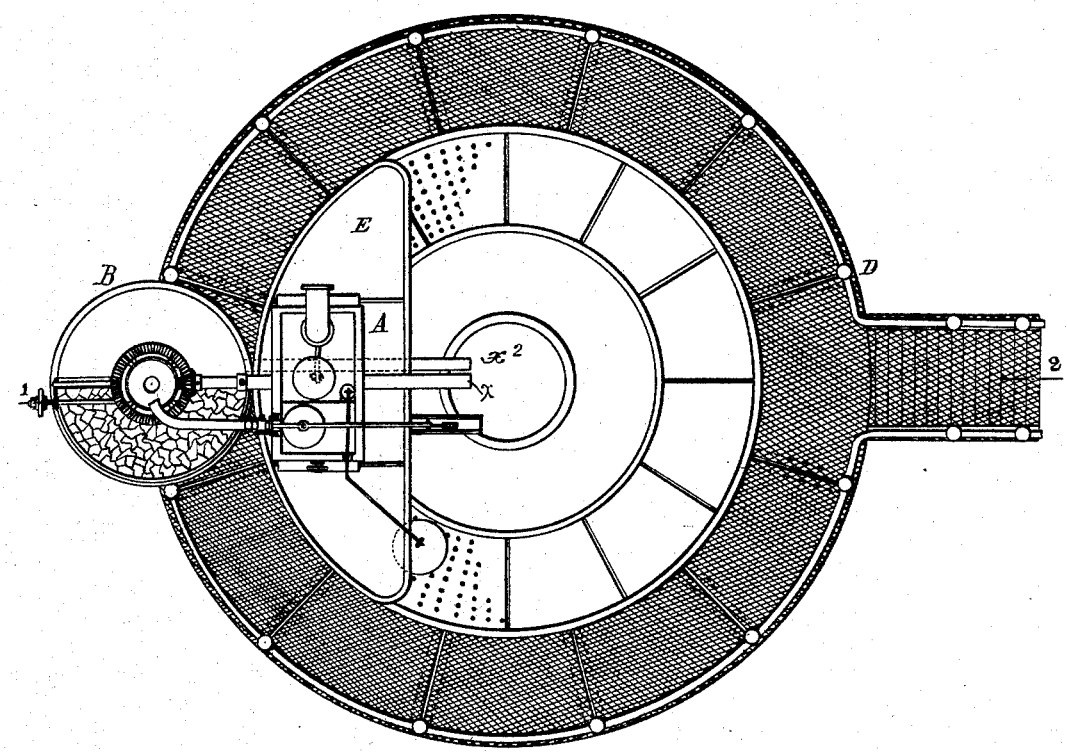
Figure 4:
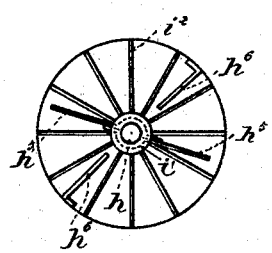
Figure 9:
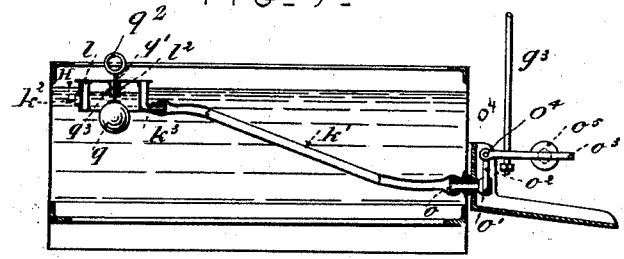
Figure 10:
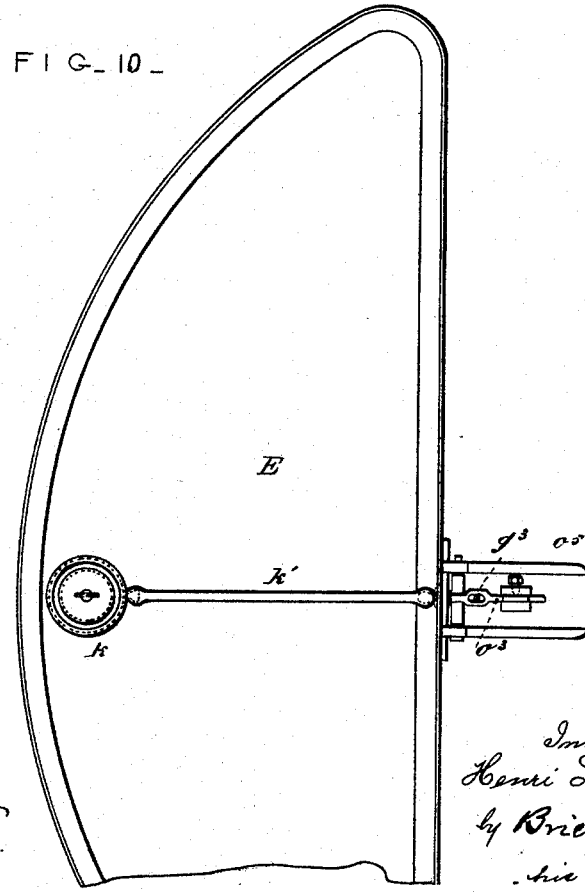

As before stated, the apparatus comprises the saturator B, the decanter D and the reagent distributer E. The decanter is not modified; it receives the water saturated with lime through the pipe $x$ and the other suitable reagent or reagents through the discharge $o$ with which the distributer E is provided. The saturator is composed of the vessel $B^4$ of a tube or vertical canal R starting from the bottom of the vessel and continuing the orifice provided in the said bottom; of a cylinder $R'$ of a greater diameter than that of the tube R joined to this canal R by the truncated cone $R^2$, and open at the bottom at the center of the bottom of a truncated cone $B'$ of the casing B. The vessel $B^4$ is provided with a grating $B^5$ on which the lime is placed; the bottom of the said vessel rests on the casing B, which starts from the ground, and both are suitably joined together, as shown in Figs. 15 and 16. The situation of the vessel $R'$ concentrically to the casing B leaves an annular space, which is narrow, and extends to the bottom $B'$ of the casing. The base of this vessel $R'$, which projects to some extent into the bottom $B'$ of the casing, may be made with openings for the purpose of dividing the current of water and thus produce a mixing with the lime. When the water leaves the said vessel $R'$ it occupies the annular space formed between the concentric cylinders B and $R'$. Lastly, the bottom B ends in a cylindrical appendix $y$, through which the apparatus is emptied, when the valve $y'$, with which it is provided, is opened. The water delivered by the inlet pipe $z$ falls upon the lime which it carries with it into the canal R, and then from there into the vessel $R'$. This water, which is already partly saturated with lime, when it has reached the bottom $R'$, turns upward into the narrow annular space which separates the vessel R and the casing B; there the water mixes with lime water which fills the said space; afterward when this saturated water reaches the space between the canal R and the casing B, the upward movement of the same becomes slower, and that by reason of the change in section of the course it follows, and whereby there is a precipitation of the excess of lime carried along and held in suspension so that the water reaches $x$ clear and saturated with lime. The arrangement of the annular and extended space between B and R', where saturation is effected, has, moreover, the advantage of preventing the danger of obstruction offered always by saturators having sharply tapered or other bottoms operating without a mixing device and in which the pipe which feeds the water to be saturated is necessarily narrow in order to get to the bottom of the saturator.

In Fig. 16 I show that the pipe R can be extended into the vessel $B^4$ under the form of a siphon. Under these conditions the section of the pipe R being greater than that of the water inlet pipe, it so happens that the water fed into the vessel $B^4$ flows intermittently through the siphon, thus agitating the liquid in the vessel and causing a less or greater stirring in and around the lower vessel R' than would be had by a continuous flow of water. It follows that the lime can be more completely made use of than by the regular current of the preceding arrangement in Fig. 15.

In conclusion I remark that it has been common heretofore in connection with purifying apparatus to utilize the waste heat of the exhaust steam coming from motors or other apparatus to cause the water to pass from a steam pipe or pipes to a vessel or vessels placed either before or after the purifier. The water, in passing through these vessels, becomes all the more heated as the waste steam is hotter and in greater quantities, whereby a great saving of fuel is secured in the subsequent uses to which this hot water is put.

By my invention I cause the exhaust steam pipe or pipes to pass through the purifier, and I do away with the heater altogether. This arrangement offers other advantages with respect to the purification itself, advantages which are as follows: first, a saving in reagents, for hot water requires for purification a less quantity of chemical products; second, a more complete purification because reactions take place more easily and more perfectly when warm than cold.

To obtain the same advantages with a separate heater, this latter must be placed before the purifier in order that the water may arrive warm at the said purifier. But in that case the steam pipes in passing through a vessel filled with foul water soon become covered with an incrustation and stop the transmission of heat on account of the interposition of the isolating matter formed by the calcareous crust. In placing, on the contrary, the heater after the purifier, one loses the advantage of the purification during warmth. I overcome these disadvantages either by having the exhaust steam to circulate in the mass of water in the purifier or by making it spend itself in the said mass. The accompanying drawings show, by way of example only, three characteristic arrangements.

In Fig. 18 the exhaust steam pipe M ends in a case N fitted in the reaction column. This pipe M extends to nearly the bottom of the said case; the steam spreads itself out in the case and condenses or is finally discharged by a pipe T, which is above. The condensed water can run off independently of the purifier or even join the mass of water in the apparatus in case there is enough force left in the exhaust steam.

Figure 19:
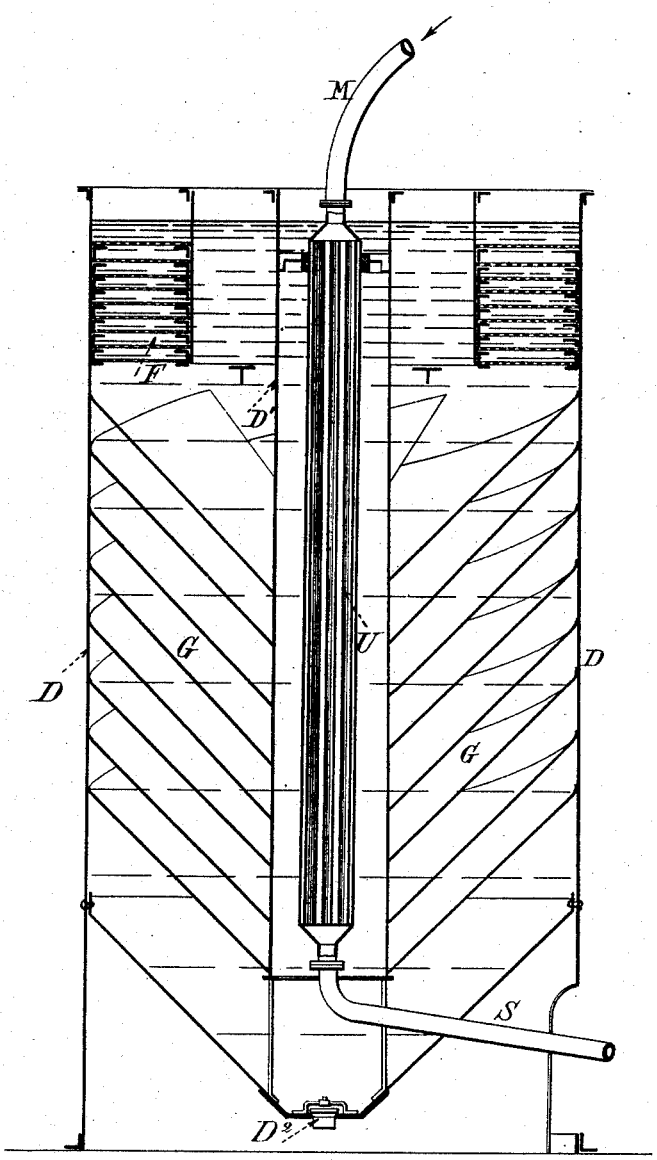

In Fig. 19 the exhaust steam pipe M leads to a series of tubes U and then afterward by means of the pipe S to the atmosphere or any other convenient place. Instead of the tubes U, I may use a spiral tube.

Lastly, in Fig. 20 I show the exhaust pipe M opening directly into the water of the reaction column; so the steam condenses itself in the water of the purifier in communicating to it all its heat.

Having described my improved purifying apparatus, I will now proceed to describe the operation of the same: The water to be purified comes in at the main supply pipe C and fills the compartment $a$ up to a level which remains always the same through the working of the float $f$. On the other hand this water runs through at pipe $b$ into the other compartment $a'$ to be distributed for the greater part by the valve $d$, on the water-wheel $e$, and from there into the reaction cylinder of the decanter D through a pipe $x$ connected with a trough beneath the wheel; a small portion of the water, however, runs through the pipe $e'$ with regulating cock $e^2$ into the preparing and saturating device B. The valve $b'$ in the distributer $a'$ is under the control of the float $c^3$ which floats on the water of the decanter above the filter with which this latter is provided. Therefore, when no water is running out of this decanter the float $c^3$ rises and the valve $b'$ closes the water port in the distributer $a'$; then, as the level of the water rises in the compartment $a$ the float $f$ stops the main water supply by causing the valve $f^2$ to enter the valve-seat in the pipe C. The water which runs through the pipe $e'$ is conducted by means of the hollow-shaft $h$ to the bottom of the mixing device and emptied therein through perforations $i^3$, the water then rising to the chamber $j$ where the lime water is formed. The valve $j'$ in the tube $i$ is next opened, allowing the milk of lime to flow into the annular space between the hollow shaft $h$ and tube $i$ to issue at the bottom thereof and be mixed thoroughly with the water brought by the shaft $h$ owing to the continual movement of the arms $h^5$ of the said shaft $h$. The water is thus saturated with lime, rises above the radial plates $i^2$, and deposits the precipitates on the helical conic blades $k$ in filling up the cylinder between the radial plates $i^2$ and the bottom of the preparator of the lime water $j$. At the top the water, saturated with lime and decanted, flows in to the center of the decanter D. The water delivered by the distributing vessel and which, after having operated the water-wheel $e$, falls into a trough $x'$ (see Fig. 1) and flows through a pipe $x$ into the reaction cylinder D', where it is mixed with the water saturated with lime of the mixing device B, and also with the reagents of the vessel E, which are distributed in the manner described. This water thus mixed runs down the cylinder D' and moves in running out of the said cylinder in an upward direction between the tapering plates G. By virtue of this upward movement the liquid comes into the spaces between said plates in going farther and farther up while the deposits, by their density, give rise to a downward flow toward the lower parts of the said spaces. At the top the decanted water is filtered in its passage through the filtering plates F, above which it issues perfectly purified and filtered, through a pipe X. It is to prevent the deposits, when they arrive at the base of the tapering plates, from being carried up again by the current of liquid, that I use the end partitions G', which are preferably vertical, but which may be more or less inclined to one side. This arrangement allows of the instantaneous cleaning of all the decanting surfaces without disconnecting the parts of the apparatus. All that is necessary is to force a current of water from above the filter F, when the water which falls into the tapering plates will run over the whole of their surface in carrying the deposits along with it.

The surfaces of the plates G are plane and the said plane surfaces, whether connected or not, succeed each other so as to present altogether a general surface which is more or less a spiral one.

I claim—

1. The combination of a reagent reservoir, a float contained therein, said float being provided with a covered top from which extends a downwardly projecting tube, and having a passage therein which communicates with said reservoir, a flexible pipe connected with the passage in said float and outlet of the reservoir, whereby the float can sink to a predetermined height and is prevented from sinking farther by the sealing of the tube therein and whereby the contents of the reservoir can be delivered in a regular manner irrespective of the height of the liquid therein, substantially as and for the purposes specified.

2. In a decanting chamber for purifying and decanting apparatus, the combination of an outer casing D, cylinder D' inclosed within said outer casing concentric thereto and communicating therewith at the lower portion, spirally arranged decanting plates G occupying the space between the outer casing and the inclosed cylinder, and filter F located above said plates G, substantially as and for the purposes specified.

3. In a saturating chamber for purifying and decanting apparatus, the combination of the chamber $j$ for the reception of lime and the like, a hollow rotating water supply shaft $h$ for conveying water to the bottom of the main saturating chamber, said shaft being provided with stirrer arms $h^5$, and a pipe $i$ surrounding said shaft $h$ for a part of its length and adapted to convey saturated water into the path of the stirrer arms, substantially as and for the purposes specified.

4. In a saturating chamber for purifying and decanting apparatus, the combination of the chamber $j$ for the reception of lime and the like, a hollow rotating water supply shaft $h$ for conveying water to the bottom of the main saturating chamber, said shaft being provided with stirrer arms $h^5$, a pipe $i$ surrounding said shaft $h$ for a part of its length and adapted to convey saturated water into the path of the stirrer arms, blades $k$ interposed between said stirrer arms $h^5$ and the lime containing chamber $j$, substantially as and for the purposes specified.

5. In a saturating chamber for purifying and decanting apparatus, the combination of the chamber $j$ for the reception of lime and the like, a hollow rotating water supply shaft $h$ for conveying water to the bottom of the main saturating chamber, said shaft being provided with stirrer arms $h^5$, and means for operating it, pipe $i$ surrounding said shaft $h$ for part of its length and to convey saturated water into the path of the stirrer arms, valve $j'$ for controlling the inlet to said pipe $i$, spirally disposed blades $k$ and radial plates $i^2$ located between said stirrer arms and the lime containing chamber, substantially as and for the purposes specified.

6. In a purifying and decanting apparatus, the combination of a receiving chamber $a$, automatic means for controlling the admission of water thereto, secondary receiving chamber $a'$ communicating with the first receiving chamber, means connected with a decanting chamber for automatically cutting off communication between the two receiving chambers $a$ $a'$ when the water in said decanting chamber reaches a predetermined height, and a float in the chamber $a'$ connected with suitable means for closing the outlet-valve of the reagent reservoir when the liquid contained in said chamber $a'$ falls to a predetermined height, substantially as and for the purposes described.

7. In a purifying and decanting apparatus, the combination of distributing device A, a separate saturating device B in communication therewith, a separate decanting device D, a reagent distributer E, said distributing device A, saturating device B and reagent device E being independently in communication with the decanting device, substantially as and for the purposes specified.

8. A distributing vessel A divided into two chambers $a\ a'$, the first one receiving the water from the main supply pipe C, means in the second chamber $a'$ for distributing water to the saturating device B and for allowing the water to flow upon a water wheel $e$ which operates a mixer in said saturator; valve $b'$ for controlling the flow of water from chamber $a$ to $a'$, said valve being connected with a float $c^3$ in a decanter from which the water is finally drawn off, and a float $g$ in the second chamber $a'$ connected with the discharge valve $o'$ of a reagent distributer E, substantially as and for the purposes specified.

9. An apparatus for purifying, decanting and filtering water, comprising a water distributing vessel regulating the supply of water to be purified, means connected therewith for producing the stoppage and starting automatically of the system, in combination with the decanting and filtering apparatus, a water-wheel put in motion by a part of the water to be purified, put in between the distributing vessel and the decanting and filtering apparatus, a preparing and saturating device, with a mixer put in motion by the water-wheel above mentioned, the said preparing device comprising a vertical vessel, in the center of which is the shaft of the mixer, which is hollow to conduct the water which is to be saturated, to the bottom of the said vessel, and to mix it there with the milk of lime brought there by a large tube surrounding the said hollow shaft, a decanter formed by a central cylinder, open at both ends, and by a cylindrical casing having between itself and the central cylinder a space fitted with screw tapering plates partly shut in at their bases by partitions, and a reagent distributer, all arranged substantially as and for the purposes specified.

In witness whereof I have hereunto set my hand in presence of two witnesses.

HENRI DESRUMAUX.

Witnesses:
GEORGE CAURENT,
ALEXANDRE HUBANT.